United States Patent
Saito

(10) Patent No.: US 6,509,988 B1
(45) Date of Patent: Jan. 21, 2003

(54) IEEE SERIAL BUS PHYSICAL LAYER INTERFACE HAVING A SPEED SETTING CIRCUIT

(75) Inventor: Tomoki Saito, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/154,161

(22) Filed: Sep. 16, 1998

(30) Foreign Application Priority Data

Sep. 16, 1997 (JP) .............................................. 9-268251

(51) Int. Cl.[7] ........................ H04B 10/00; H04B 10/20; H04J 14/00; G06F 13/42
(52) U.S. Cl. ........................ 359/152; 359/121; 710/105
(58) Field of Search ................................ 359/152, 163; 710/105, 106, 107

(56) References Cited

U.S. PATENT DOCUMENTS

| | | | | |
|---|---|---|---|---|
| 4,458,314 A | * | 7/1984 | Grimes | 364/200 |
| 4,663,748 A | * | 5/1987 | Karbowiak | 370/89 |
| 4,748,617 A | * | 5/1988 | Drewlo | 359/121 |
| 5,130,836 A | * | 7/1992 | Kaharu | 359/152 |
| 5,144,466 A | * | 9/1992 | Nakamura | 359/123 |
| 5,187,605 A | * | 2/1993 | Shikata | 359/152 |
| 5,263,172 A | * | 11/1993 | Olnowich | 395/800 |
| 5,280,587 A | * | 1/1994 | Shimodaira | 395/275 |
| 5,289,582 A | * | 2/1994 | Hirata | 395/275 |
| 5,465,333 A | * | 11/1995 | Olnowich | 395/281 |
| 5,495,358 A | * | 2/1996 | Bartig | 359/189 |
| 5,504,757 A | * | 4/1996 | Cook et al. | 370/468 |
| 5,881,240 A | * | 3/1999 | Asano | 395/200.63 |
| 5,892,933 A | * | 4/1999 | Voltz | 395/311 |
| 5,926,303 A | * | 7/1999 | Giebel | 359/163 |
| 6,108,713 A | * | 8/2000 | Sambamurthy | 709/250 |

OTHER PUBLICATIONS

Japanese Office Action, dated Aug. 8, 2000, with English language translation of Japanese Examiner's comments.

* cited by examiner

Primary Examiner—Jason Chan
Assistant Examiner—David Payne
(74) Attorney, Agent, or Firm—Whitham, Curtis & Christofferson, PC

(57) ABSTRACT

A physical layer interface for an IEEE-1394 serial bus node includes multiple port transceivers connected to respective serial buses. A controller, connected to a link layer and the port transceivers, supplies control signals to an encoder/decoder for performing data conversion between the link layer and the port transceivers and to a repeater for repeating bus traffic between the port transceivers. A speed setting circuit is provided for storing a lowest value of transmission speeds of the port transceivers in a register map of the controller as a top speed of the node. The controller is arranged to read the stored speed value from the register, receive a speed value from another node and begin packet transmission at a lower one of the stored and received speed values.

7 Claims, 3 Drawing Sheets

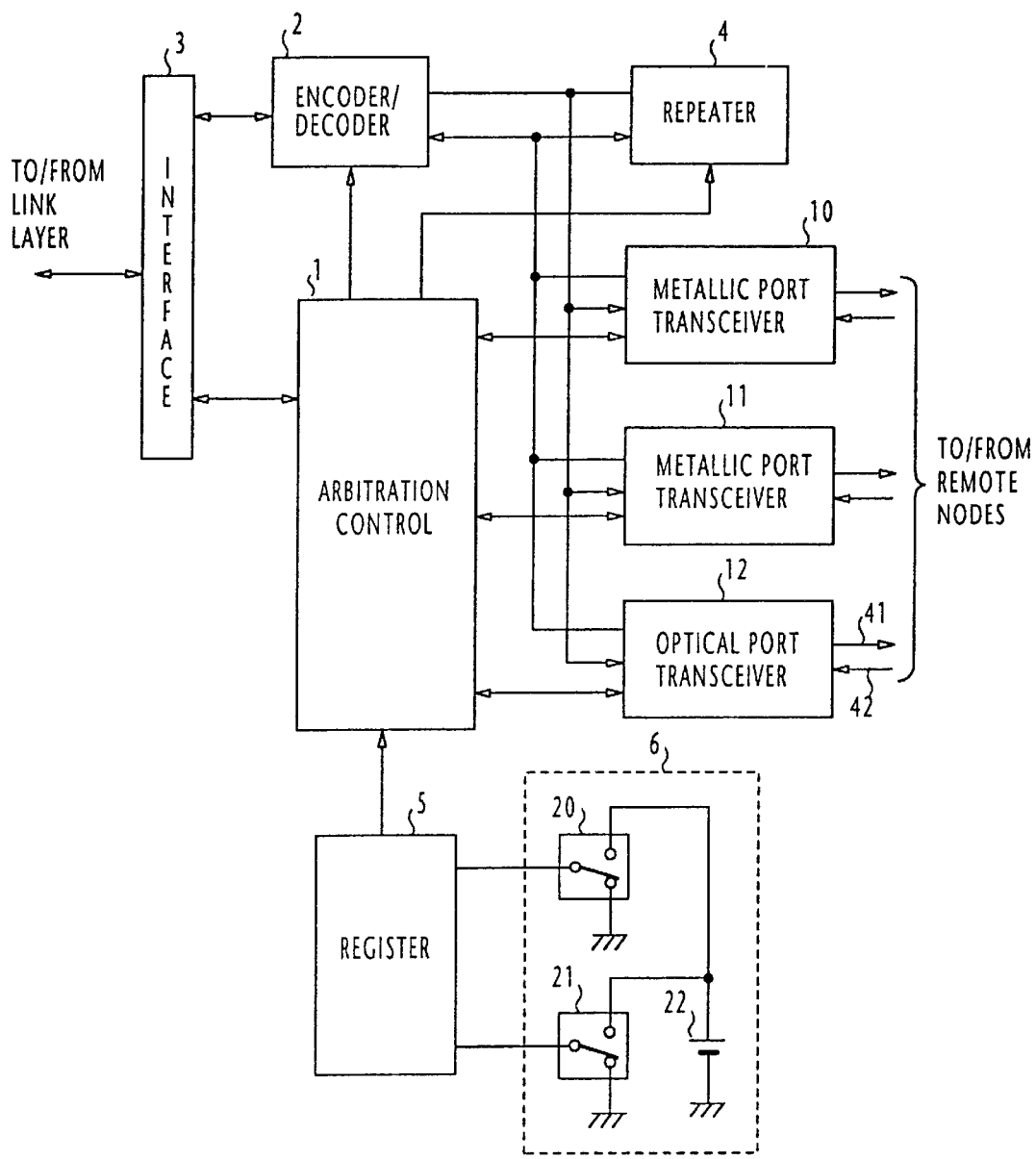

IEEE SERIAL BUS PHYSICAL LAYER INTERFACE HAVING A SPEED SETTING CIRCUIT

BACKGROUND OF THE INVENTION

1. Field of the Invention

The present invention relates to generally to high speed data transmission on serial buses, and more specifically to a multiport physical layer interface for an IEEE 1394 serial bus node.

2. Description of the Related Art

A high speed serial bus for transfer of both asynchronous and isochronous data between a computer and peripheral devices (or nodes) is standardized by the IEEE in 1995 as "IEEE Standard for High Performance Serial Bus". An arbitration controller is provided between the link layer and multiple port transceivers to perform bus configuration, arbitration and packet transmission according to operating parameters stored in a register map. These operating parameters are loaded into the register map under control of the link layer processor. Each port transceiver is connected to two pairs of twister wire to transfer data at one of maximum speeds of 100 Mbps, 200 Mbps and 400 Mbps. The lowest of the maximum speed values of the multiple port transceivers is set into the register map as the top speed of a node. Before packet transmission, the set speeds of adjacent nodes are compared with each other and packet transmission begins with the lower of the two so that they operate at a common speed. As a means for extending the current inter-nodal maximum length of 4.5 meters, the use of plastic optical fibers has been proposed as described in "Draft of Long Distance 1394 (100 m) Physical Layer As a Response to a DAVIC's CFP8 Section 4.1.3.3 The A20 Reference Point, Home Network", $17^{th}$ DAVIC (Digital Audio-Visual Council) meeting in San Jose Jun. 16–20, 1997, CFP8_011 ($8^{th}$ Call for Proposals). Since the maximum speed of plastic optical fiber is 100 Mbps and since the IEEE 1394 requires that a maximum speed of 200 Mbps be stored in the register map as a default value, the use of a plastic optical fiber in combination with twisted pairs would result in a port transceiver receiving a 200 Mbps signal and repeating it on a port transceiver operating at the maximum speed of 100 Mbps. Therefore, there exists a need for manually setting the top speed of a node in a register map from a command source located at each access, rather than from a process on the upper layer.

SUMMARY OF THE INVENTION

It is therefore an object of the present invention to provide a physical layer interface having a speed setting circuit for setting the top speed of an IEEE serial bus node.

According to a first aspect of the present invention, there is provided a physical layer interface of an IEEE-1394 serial bus node comprising a plurality of port transceivers connected to respective serial buses, a controller connected to a link layer and the port transceivers, an encoder/decoder responsive to a control signal from the controller for performing data conversion between the link layer and the port transceivers, a repeater responsive to a control signal from the controller for repeating bus traffic between the port transceivers, a register for storing operating parameters of the controller, and a speed setting circuit for storing a lowest value of transmission speeds of the port transceivers in the register as a top speed of the node. The controller is arranged to read the stored speed value from the register, receive a speed value from another node and transmit packets at a lower one of the stored and received speed values.

According to a second aspect, the present invention provides a physical layer interface of an IEEE-1394 serial bus node comprising a plurality of port transceivers connected to respective serial buses, a controller connected to a link layer and the port transceivers, an encoder/decoder responsive to a control signal from the controller for performing data conversion between the link layer and the port transceivers, a repeater responsive to a control signal from the controller for repeating bus traffic between the port transceivers, a register for storing operating parameters of the controller, a first speed setting circuit located in a first port transceiver of the plurality of port transceivers for setting an operating speed of the first port transceiver, a second speed setting circuit located in a second port transceiver of the plurality of port transceivers for setting an operating speed of the second port transceiver, and a compare-and-select circuit for comparing the operating speed set by the first speed setting circuit with the operating speed set by the second speed setting circuit and storing a lower value of the set operating speeds in the register as a top speed of the node. The controller is arranged to read the stored speed value from the register, receive a speed value from another node and begin packet transmission at a lower one of the stored and received speed values.

Preferably, an optical port transceiver is implemented with a first driver having a pair of differential output terminals, the first driver receiving a control signal from the controller to develop a line state voltage across the output terminals, a light modulator for modulating a light beam according to the line state voltage to produce a first modulated light beam, a directional coupler for causing the first modulated light beam to propagate through an optical link in a first direction and detecting a second modulated light beam propagating through the optical link in a second direction opposite to the first direction, an optical detector for detecting a line state voltage from the second modulated light beam and producing therefrom a control signal, and a second driver having a pair of differential output terminals, the second driver receiving the control signal from the optical detector to develop a reconstructed line state voltage across the differential output terminals, the differential output terminals of the first and second drivers being connected together to the controller.

BRIEF DESCRIPTION OF THE DRAWINGS

The present invention will be described in further detail with reference to the accompanying drawings, in which:

FIG. 1 is a block diagram of a physical layer interface of an IEEE-1394 serial bus node according to one embodiment of the present invention;

FIG. 2 is an illustration of data to be stored in the register according to different maximum operating speeds of port transceivers;

DETAILED DESCRIPTION

Figure 3:
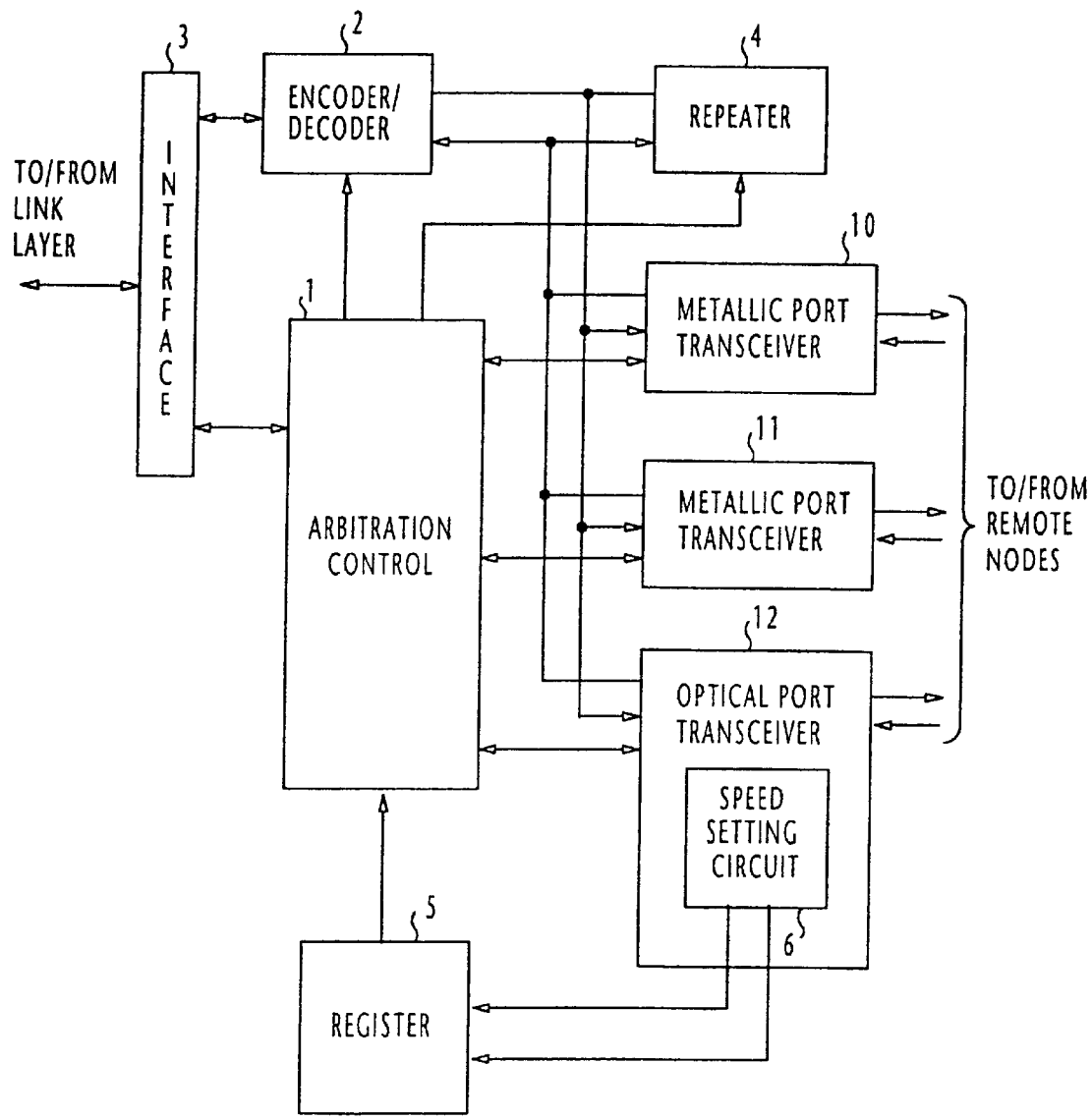
FIG. 3 is a block diagram of a modified physical layer interface of the present invention.

Referring to FIG. 1, there is shown a physical layer interface of an IEEE-1394 serial-bus node according to one embodiment of the present invention. The physical layer interface has multiple port transceivers 10, 11 and 12 which may have different maximum transmission speeds. Port transceivers 10 and 11 are metallic-line transceivers, each operating with a target node over a serial bus formed with two pairs of twisted wire (or unshielded twisted pairs) and the port transceiver 12 is an optical-line transceiver which operates over a pair of optical links such as plastic optical fiber (POF). These port transceivers are connected to an arbitration controller 1 and a data/strobe-link encoder/decoder 2.

Arbitration controller 1 performs arbitration as specified by the IEEE 1394-1995 standard between nodes vying for ownership of the serial bus and determines a common transmission speed when communicating nodes have different maximum transmission speeds. DS-link encoder/decoder 2 performs data format conversion between the data strobe signals to and from the port transceivers 10, 11 and coded-decoded signals to and from the port transceiver 12. Specifically, it receives NRZ signal from the link layer via an interface 3 and converts it into a data stream and strobe pulses by modulo-2 (i.e., exclusive-OR) combining clock pulses with the data stream. The data stream is transmitted onto a twisted pair "A" (TPA) and the strobe pulse is transmitted on a twisted pair "B" (TPB). In the decoding process, the encoder/decoder 2 modulo-2 combines the received data stream with the received strobe pulses to recover the original clock pulses. The bus links of each pair are crosswired along the way to the other node so that a TPA of a node is a TPB of the other node.

The multiport node is further provided with a repeater 4. Each port transceiver monitors its bus during the arbitration phase of a transaction to determine which port is receiving and which is transmitting a given packet. Arbitration controller 1 then enables the port transceivers that should transmit cable traffic. If one of the metallic transceivers receives a packet that is destined for another node, the arbitration controller 1 commands the repeater 4 to repeat it on the other metallic transceiver. If such a transit packet is to be relayed between the optical transceiver 12 and one of the metallic transceivers, the arbitration controller commands the DS-link encoder/decoder 2 to perform data format conversion between these optical and metallic transceivers.

Further connected to the arbitration controller 1 is a register 5 in which a register map is defined to store a number of operating parameters under control of the link layer via the arbitration controller 1. The stored operating parameters are loaded into the arbitration controller 1 at the beginning of system operation or whenever need arises. A two-bit speed setting area is reserved in the register map. A speed setting circuit 6 is connected to the register 5 to set the transmission speed of the node into the speed setting area of the register map, which is currently set by command signals given by the link layer. This simplifies the speed setting arrangement and the complexity of LSI chips in the higher-layer processors.

Speed setting circuit 6 includes manually operated switches 20 and 21, each having upper and lower contact positions respectively connected to a voltage source 22 and ground. By manually operating the moving contacts of switches 20 and 21, a two-bit parallel code is supplied to the register 4 and stored in the speed setting area of the register map. As shown in FIG. 2, the switches 20 and 21 are operated to provide one of two-bit codes "00", "01", "10" respectively representing maximum speeds of 100 Mbps, 200 Mbps and 400 Mbps. A two-bit code "11" is reserved for future use.

Switches 20 and 21 are used to indicate the top speed with which the local node can accept and transmit packets. This top speed corresponds to the lowest of the maximum speeds of port transceivers which are attached to the node. If the maximum speed of transceivers 10 and 11 is 200 Mbps and that of transceiver 12 is 100 Mbps, a two-bit code "00" is set in the register 4 to indicate that the top speed of the node is 100 Mpbs.

When the node wishes to send a packet, the node arbitrates with another node for the bus. After gaining ownership of the bus, the arbitration controller 1 reads the top speed of the node from the register 4 and exchanges it with the top speed of the other node and begins packet transmission at the lower of the two speed values.

A modified embodiment of the present invention is shown in FIG. 3. In this modification, the speed circuit 6 is located within the optical port transceiver 12. Since the maximum transmission speed of the optical transceiver 12 is currently 100 Mbps which is the lowest of the transmission speeds of all port transceivers, the switches of the built-in speed setting circuit 6 are set to 100 Mbps. This set speed value is automatically stored into the register 5 when the port transceiver 12 is assembled with other circuits to the node during manufacture.

Figure 4:
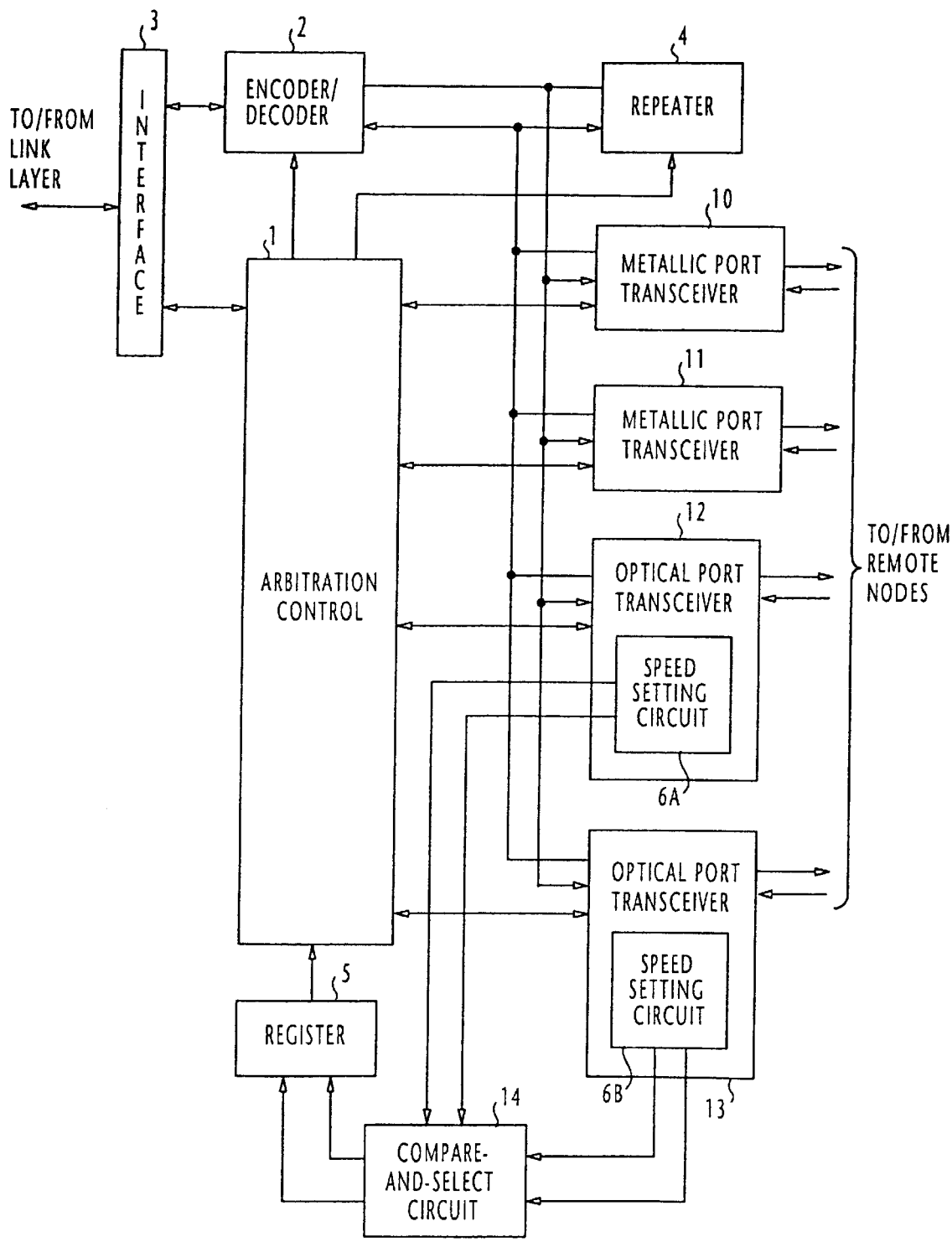
FIG. 4 is a block diagram of a further modification of the physical layer interface of the present invention.

The embodiment of FIG. 3 is modified as shown in FIG. 4. In this modification, a second optical port transceiver 13 with a built-in speed setting circuit 6B and a compare-and-select circuit 14 are additionally provided. Speed setting circuit 6B in the port transceiver 13 as well as the speed setting circuit 6A in the port transceiver 12 set their speed values. Since the minimum speed of port transceiver 13 may be 200 Mbps which is higher than the 100 Mbps of the port transceiver 12, a compare-and-select circuit 14 is provided for making a comparison between the two set speed values and automatically storing the lower of the two into register 5 when the port transceivers 12 and 13 are assembled with other circuits of the node during manufacture.

What is claimed is:

1. A physical layer interface for an IEEE-1394 serial bus node, comprising:

a plurality of port transceivers connected to respective serial buses and capable of operating at different maximum speeds;

a controller connected to a link layer and said port transceivers;

an encoder/decoder respective to a control signal from said controller for performing data conversion between the link layer and said port transceivers;

a repeater responsive to a control signal from said controller for repeating bus traffic between said port transceivers;

a register having a plurality of entries respectively corresponding to said port transceivers, each of the entries including a first field for storing a specified value and a second field for storing the maximum operating speed of the corresponding port transceiver; and a speed setting circuit for setting a lowest transmission speed value in the first field of one of said entries of the register as said specified value, said controller reading the specified value stored in said register and determining the lowest of the maximum operating speeds of said plurality of port transceivers as an operating speed of said IEEE-1394 serial bus node.

2. The physical layer interface of claim 1, further comprising a comparator for making a comparison between speed values stored in at least two of said port transceivers, wherein said controller is arranged to respond to an output of the comparator for operating said port transceivers at a speed corresponding to a lowest one of the compared speed values.

3. The physical layer interface of claim 1, wherein said plurality of port transceivers comprises different types of transceivers, wherein said encoder/decoder comprises data format conversion circuitry interconnected between said different types of transceivers for providing conversion of data format.

4. A physical layer interface for an IEEE-1394 serial bus node, comprising:

a plurality of port transceivers connected to respective serial buses and capable of operating at different maximum speeds;

a controller connected to a link layer and said port transceivers;

an encoder/decoder respective to a control signal from said controller for performing data conversion between the link layer and said port transceivers;

a repeater responsive to a control signal from said controller for repeating bus traffic between said port transceivers;

a register having a plurality of entries respectively corresponding to said transceivers, each of the entries including a first field for storing a specified value and a second field for storing the maximum operating speed of the corresponding port transceiver;

a first speed setting circuit located in a first port transceiver of said plurality of port transceivers for setting a first operating speed value for said first one of said port transceivers;

a second speed setting circuit located in a second port transceiver of said plurality of port transceivers for setting a second operating speed value for said second one of said transceivers;

a comparator for comparing the first and second operating speed values and storing a lower one of the first and second operating speed values in the first field of one of the entries of said register as said specified value, said controller reading the specified value stored in said register and determining the lowest of the maximum operating speeds of said plurality of port transceivers as an operating speed of said IEEE-1394 serial bus node.

5. The physical layer interface of claim 4, wherein said plurality of port transceivers comprise different types of transceivers, wherein said encoder/decoder comprises data format conversion circuitry interconnected between said different types of transceivers for providing conversion of data format.

6. The physical layer interface of claim 4, wherein said first and second ones of said port transceivers are optical transceivers.

7. The physical layer interface of claim 6, wherein said first and second speed setting circuits are located in said first and second port transceivers.

* * * * *